Oct. 18, 1938.   L. O. PARKER   2,133,472
CONTACT ASSEMBLY
Filed Aug. 3, 1936

INVENTOR
Leslie O. Parker
BY
Spencer, Hardman & Fehr
his ATTORNEYS

Patented Oct. 18, 1938

2,133,472

UNITED STATES PATENT OFFICE 2,133,472

CONTACT ASSEMBLY

Leslie O. Parker, Anderson, Ind., assignor to General Motors Corporation, Detroit, Mich., a corporation of Delaware Application August 3, 1936, Serial No. 94,010

2 Claims. (Cl. 200—59)

This invention relates to improvements in a circuit controlling device, and more particularly to a fixed contact assembly to be used in connection with a horn button assembly similar to that shown in my Patent No. 1,983,095, issued December 4, 1934, for "Contact assembly".

The particular feature to which this invention relates is a fixed contact assembly adapted to be placed within the steering column which cooperates with a movable contact reciprocating through and rotatable with the steering wheel hub.

An object of the present invention is to provide a contact member formed in a particular configuration from a single blank of metal to provide a contact surface, having anchoring elements integral therewith so that when forced into a soft, flexible resilient rubber bushing, it is quickly and easily secured in operative position the construction of the anchoring elements being such that the resiliency of the bushing will clamp the elements yieldably to hold the contact member in assembled relation with the bushing.

Another object of the invention is to provide a contact assembly of a construction which is simple and yet sturdy of construction, readily and economically manufactured and easily mounted within a tubular housing.

Further objects and advantages of the present invention will be apparent from the following description, reference being had to the accompanying drawing wherein a preferred embodiment of the present invention is clearly shown.

Figure 1:
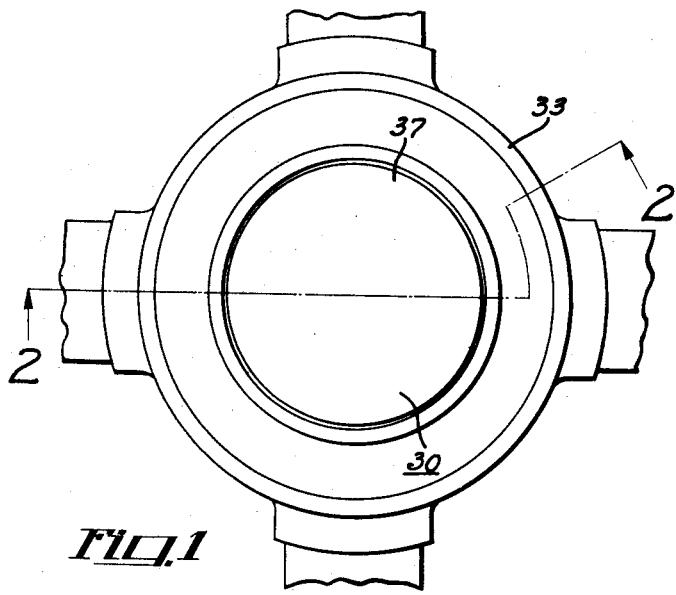
Fig. 1 is a fragmentary top plan view of a steering post embodying the present invention.

Referring to the drawing 20 designates a hub casting provided with a central recess 21 and a central bore 22 which fits upon a tapered end 23 of a steering shaft 24. The hub casting 21 is secured to the shaft or post by a nut 25 disposed in the recess 21. The threading of the nut 25 upon the threaded end of the post 24 forces the hub casting upon the tapered portion of the post. The casting 20 is prevented from rotating about the post by a key 26, indicated by dotted lines in Fig. 2.

The recess 21 forms a housing for a soft rubber horn button 30 having a bottom annular flange 31. The button 30 is retained within the housing by a depending annular flange 32 of a cover plate 33 that is secured to the hub casting 20. The horn button 30 supports or carries a hair pin member 34 having legs 35 and 36. These legs are guided in diametrically disposed passages provided by the hub casting 20. The horn button is further provided with a cover 37 of stiff material, such as celluloid or any other suitable material, so that the button 30 may be depressed without deformation thereof beyond a certain point. Thus the hair pin 34 is reciprocally movable along the axis of the hub 20 and is resiliently urged to the retracted position by the inherent resiliency of the button 30.

The steering column, supporting the shaft 24, includes a tubular member 40 encircling the shaft and telescopically engaging a portion 41 of the hub casting 20. The member 40 is deformed intermediate its ends to provide detents or ribs 42 and 43. A lug 44 is struck inwardly at the bottom or near the lower end of one of the ribs, in this instance the rib 43, to provide a stop for a contact assembly 45.

Figure 5:
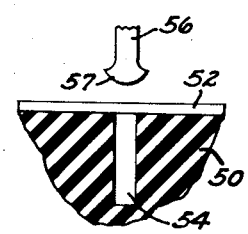
Fig. 5 is a fragmentary detail on an enlarged scale showing the end of a prong of the contact member and a portion of the resilient member prior to the assembly thereof.
Figure 6:
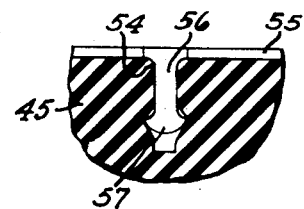
Fig. 6 is an enlarged sectional view illustrating the manner in which the contact member is held to the resilient bushing.

In the present instance, the contact assembly 45 includes a bushing 50 preferably of soft, flexible resilient rubber material. The bushing is preferably formed with a plurality of peripheral longitudinal grooves 51, an annular groove 52 formed on one end thereof, a through passage 53 and a plurality of spaced recesses or pockets 54. This bushing supports an annular contact member 55 provided with a plurality of anchoring elements or prongs 56 having rounded enlarged head portions 57, as clearly shown in Figs. 5 and 6. The purpose of the rounded portion on the prongs is to facilitate the assembly of the contact member 55 with the bushing 50. One of the prongs 56 is preferably provided with an aperture through which is threaded a bared end of an insulated conductor 58, after which the bared end is soldered to the prong, as indicated at 59.

In assembling the contact member 55 to the bushing 50, the free end of the conductor 58 is first threaded through the through passage 53.

Then the member 55 is attached to the resilient bushing by forcing one of the heads into the through passage and other into the pockets. Since the bushing is made of resilient material capable of being distorted to permit insertions of the prongs 56, the prongs are easily forced into their respective receiving through passage and recesses until the member 55 is properly positioned within the annular groove 53. When the annular member is properly positioned in the annular groove, the outer surface of the member 55 should be flush with the end surface of the bushing. The contact member is prevented from being accidentally removed from the bushing due to the fact that the resiliency of the bushing will cause the walls of the through passage and the walls of the recesses or pockets to bear against the prongs 56 and yieldably maintain the contact member 55 in an assembled relation with the bushing. The prongs may be easily removed from the bushing by applying sufficient pull on the contact member to pull the prongs from the through passage and the pockets.

Figure 2:
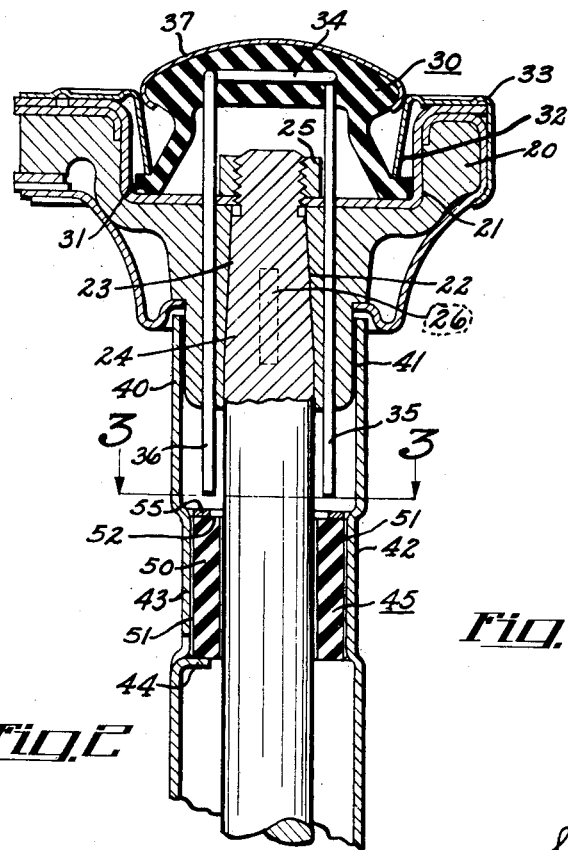
Fig. 2 is a sectional view of a steering column embodying the present invention taken substantially on line 2—2 of Fig. 1.
Figure 3:
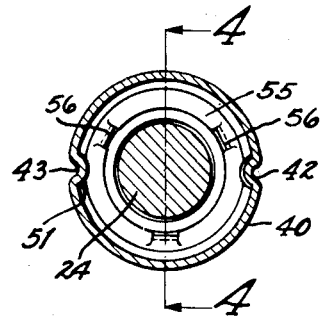
Fig. 3 is a sectional view taken on line 3—3 of Fig. 2.
Figure 4:
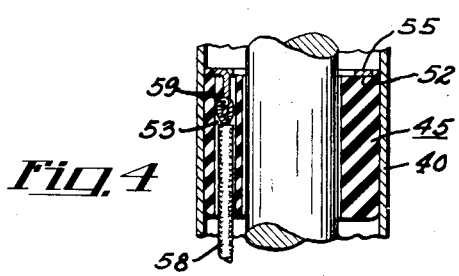
Fig. 4 is a sectional view taken on line 4—4 of Fig. 3.

The contact assembly thus formed may be readily positioned in the tubular member or steering column 40, as shown in Fig. 2. When the assembly is in position, the resilient bushing 50 will surround the shaft or post 24 and the grooves 51 will receive their respective detent or rib 42 and 43, said ribs operating to prevent the whole contact assembly from rotating within the tubular member 40. The stop or lug 44 prevents the contact assembly from sliding to the bottom of the tubular member 40. By this arrangement the contact assembly will thereby be properly insulated from all of the elements of the steering column structure and the contact surface of the member 55 will be adjacent the ends of the arms 35 and 36 of the hair pin structure 34 which is grounded and operable to close a circuit through a sound signal and a current source.

It is obvious from the structure shown in Fig. 2 the operation will be readily understood. The movable contact or hair pin 34 is grounded through its connection with the hub casting 20 of the steering wheel. When the button 30 is depressed one or both of the arms 35 and 36 will engage the annular contact member 55, no matter what position the steering wheel, to close a circuit. The contact member 55 is connected to the current source through the insulated conductor 58 which is electrically connected to one of the prongs 56 carried by the contact member, when the pressure on the button is released the resiliency of the button will cause the arms 35 and 36 to be separated from the contact member 55, and thus open the circuit.

While the embodiment of the present invention as herein disclosed, constitutes a preferred form, it is to be understood that other forms might be adopted, all coming within the scope of the claims which follow.

What is claimed is as follows:

1. In an electrical connector, the combination comprising a resilient bushing formed with a plurality of spaced recesses; an annular contact member having a plurality of prongs provided with head-portions of greater dimensions than the recesses, there being a prong received by each recess, the resiliency of the bushing clamping the prongs against the inner walls of the recesses yieldingly to hold the contact member and bushing in assembled relation.

2. In an electrical connector, the combination comprising a resilient bushing formed with a longitudinal passage and a plurality of spaced recesses; an annular contact member having a plurality of prongs provided with head portions of greater dimensions than the passage and the recesses, one of the prongs extending into the passage and others extending into the recesses, the resiliency of the bushing clamping the prongs against the inner walls of the passage and of the recesses yieldably to hold the contact member in an assembled relation with the bushing; and an insulated conductor having a stripped end extending into the passage, said stripped end being electrically connected with the prong within the passage.

LESLIE O. PARKER.